United States Patent [19]

Schoenmakers

[11] Patent Number: 4,536,857
[45] Date of Patent: Aug. 20, 1985

[54] DEVICE FOR THE SERIAL MERGING OF TWO ORDERED LISTS IN ORDER TO FORM A SINGLE ORDERED LIST

[75] Inventor: Wijnand J. Schoenmakers, Eindhoven, Netherlands

[73] Assignee: U.S. Philips Corporation, New York, N.Y.

[21] Appl. No.: 471,974

[22] Filed: Mar. 4, 1983

[30] Foreign Application Priority Data

Mar. 15, 1982 [NL] Netherlands ............... 8201057

[51] Int. Cl.³ .............. G06F 7/06; G06F 13/06; G06F 7/16; G06F 7/36
[52] U.S. Cl. .................... 364/900; 364/300
[58] Field of Search ... 364/200 MS File, 900 MS File, 364/300

[56] References Cited

U.S. PATENT DOCUMENTS

| T912,008 | 7/1973 | Bennett et al. | 364/300 |
| T921,028 | 4/1974 | Bennett et al. | 364/300 |
| T924,001 | 7/1974 | Bennett et al. | 364/300 |
| T938,007 | 9/1975 | Frazer et al. | 364/300 |
| T972,003 | 7/1978 | Coleman, Jr. | 364/300 |
| 3,931,612 | 1/1976 | Stevens | 364/900 |
| 4,003,031 | 1/1977 | Kashio | 364/900 |
| 4,209,845 | 6/1980 | Berger et al. | 364/900 |
| 4,210,961 | 7/1980 | Whitlow | 364/300 |
| 4,321,760 | 3/1982 | Timmons | 364/300 |
| 4,425,617 | 1/1984 | Sherwood | 364/200 |

Primary Examiner—James D. Thomas
Assistant Examiner—A. E. Williams, Jr.
Attorney, Agent, or Firm—Jack E. Haken; James J. Cannon, Jr.

[57] ABSTRACT

A merging device is used for combining a first list and a second list in order to form a result list. All lists satisfy a linear ordering criterion. At the beginning of the actual merging operation, the second list is stored in a random access memory. This memory is divided into (kmax) memory blocks, the second list filling at the most the (kmax-2) non-largest memory blocks thereof. Efficient bookkeeping is achieved by means of two block list updating devices.

6 Claims, 16 Drawing Figures

| A2 | A4 | A5 | A7 | A8 | A10 | A11 | A13 | A14 | A16 | A17 | A19 |
|----|----|----|----|----|-----|-----|-----|-----|-----|-----|-----|
| A1 | A2 | A4 | A5 | A7 | A8  | A10 | A11 | A13 | A14 | A16 | A17 |
| –  | A1 | –  | –  | –  | –   | –   | A10 | A10 | A10 | A10 | –   |
| –  | –  | A2 | –  | –  | –   | –   | –   | A11 | A11 | A11 | A11 |
| –  | –  | –  | A4 | A4 | –   | –   | –   | –   | A13 | A13 | A13 |
| –  | –  | –  | –  | A5 | A5  | –   | –   | –   | –   | A14 | A14 |
| B0 | –  | –  | –  | –  | A7  | A7  | A7  | –   | –   | –   | A16 |
| B3 | B3 | B3 | B3 | –  | –   | A8  | A8  | A8  | –   | –   | –   |
| B6 | B6 | B6 | B6 | B6 | B6  | B6  | –   | –   | –   | –   | –   |
| B9 | B9 | B9 | B9 | B9 | B9  | B9  | B9  | B9  | –   | –   | –   |
| B12| B12| B12| B12| B12| B12 | B12 | B12 | B12 | B12 | B12 | B12 |
| B15| B15| B15| B15| B15| B15 | B15 | B15 | B15 | B15 | B15 | B15 |
| B18| B18| B18| B18| B18| B18 | B18 | B18 | B18 | B18 | B18 | B18 |
| –  | B0 | A1 | A2 | B3 | A4  | A5  | B6  | A7  | A8  | B9  | A10 |
| –  | –  | B0 | A1 | A2 | B3  | A4  | A5  | B6  | A7  | A8  | B9  |

DEVICE FOR THE SERIAL MERGING OF TWO ORDERED LISTS IN ORDER TO FORM A SINGLE ORDERED LIST

BACKGROUND OF THE INVENTION

1. Field of the Invention

The invention relates to a device for the merging of a first list of first elements which is ordered according to a first linear ordering criterion with a second list of second elements which is ordered according to a second linear ordering criterion in order to form a result list of third elements which is ordered according to a third linear ordering criterion. The result list consists of representations of elements of the first list and the second list. Each element of each of the lists contains a quantitative term and ordering is performed on the basis of the value of this term; consequently, relationships also exist between the first, the second and the third ordering criteria as will be explained hereinafter. The term may be explicitly contained in the element, or alternatively implicitly. When the date of birth of a person is explicitly given, the age is implicitly given. Each element may contain further data. When the elements are merged, the information contained therein can be processed in different ways, but this will not be considered herein. There are four linear ordering criteria, that is to say smaller than, smaller than or equal to, larger than, and larger than or equal to (each time a relationship between a preceding element and a later element of the list). The first two criteria have the same ordering direction, and so have the last two criteria. Representation is to be understood to mean herein that each first or second element has one representative third element. However, in some cases it is advantageous for there to be only one representative element for two first elements having the same term value, two second elements having the same term value or a first element and a second element having the same term value. Thus, several possibilities exist which all constitute a representation function.

2. Description of the Prior Art

A device of the kind set forth is known from U.S. Pat. No. 4,276,611 which is assigned to the assignee of the present application, which device will be described in greater detail hereinafter. The known device may be constructed as a fast device, but requires an extensive, distributed processing capability for the list elements.

SUMMARY OF THE INVENTION

It is an object of the invention to provide a data processing device in which one of the two lists to be merged may consist of an unknown number of elements which are presented from a serial memory which need be scanned only once in the first instance, the second list to be merged therewith being stored in a random access read/write memory having only a limited capacity, it being possible to perform the processing centrally and only a simple bookkeeping system being required for the storage in the read/write memory. The device in accordance with the present state of the art requires a large number of parallel and similarly operating data control elements.

In accordance with the invention the device comprises:

(a) a random access read/write memory M(j) which comprises a number of (kmax)>2 memory blocks, the (kmax−2) non-largest blocks thereof having a capacity which is sufficient for the storage of the second list;

(b) a serial operating memory input/output for receiving said first elements and for outputting said third elements, said receiving and outputting having equal rates;

(c) a control device for the merging operation, comprising:

(c1) a storage control device for successively storing said second elements in said (kmax−2) memory blocks;

(c2) indicator means for updating, when said serial operating memory input/output is activated, a first running write address for the writing of said first elements, for updating a first running read address for the first elements stored in the read/write memory, and for updating a second running read address for the second elements stored in the read/write memory;

(c3) comparison means for comparing, in a first state of said comparison means and in accordance with the third linear ordering criterion, the first and second elements stored at said first and second running read addresses and indicated by the indicator means, and for making one element thereof available for supply to the serial memory input/output on the basis of the comparison;

(c4) a first block list updating device for the updating of a series of start addresses of memory blocks used for the storage of said first elements;

(c5) a second block list updating device for indicating the start addresses of at least two memory blocks, and under the control of the passing of a memory block end by the first or second running read address, for indicating the start address of the memory block thus vacated and, under the control of the passing of a memory block end by the first running write address, for making a start address of a memory block thus far indicated available to the indicator means as a new first write address for the storage of said first elements, and for deactivating the latter indication within the second block list updating device, at least two memory blocks outside said (kmax−2) memory blocks being indicated in an initial state;

(c6) vacating means for presenting, after the reception of the last one of said first elements on the serial memory connection, further first and/or second elements stored in the read/write memory to the serial memory input/output in cooperation with said comparison means.

The invention is inter alia based on recognition of the fact that, when a memory block has been completely filled with elements of the first list so that a further memory block must be used for still further elements of the first list, at least one memory block must be completely empty at that instant. This is because the storage of elements of different lists in the same memory block is not permissible, because otherwise there would be the risk of coincidence of the first running write address and the second running read address, which would create a situation which is very difficult to control. Whether or not the sizes of the memory blocks are the same, when at least initially the two largest blocks are reserved for the first list, such a difficult situation will never occur. Another interpretation of the foregoing is that when the read/write memory is partly filled with elements of the second list, the remaining free space is divided into two (or more) free blocks. The filled part is then divided into further blocks which, however, may not be larger than either of the two largest free blocks. For as long as the total number of memory blocks does not become excessively large, simple bookkeeping remains possible. Should bookkeeping become too complex, the storage space required for bookkeeping would inadmissibly reduce the total storage space available. The serially operating memory connection should be capable of outputting a third list element for each first list element received. When several first elements received are represented by one third element, a dummy third element can be outputted for each of these first elements except one. When suitable steps are taken those third elements which are separated by dummy elements can be rendered contiguous in time, for example by using a first-in-first-out memory having a fall-through facility.

Preferably, all (kmax) memory blocks have the same capacity for (lmax) of the first and second list elements. In some cases this results in some loss of storage capacity in the read/write memory. On the other hand, it has been found that the bookkeeping thus becomes very simple, because use can then be made of relative addresses which are always subject to permissible upper limit.

Preferably, the second block list updating device indicates a first and a second memory block start address and comprises an indicator for indicating the most recently received one thereof in order to indicate that the least recently received one thereof may be replaced by a newly received start address and also that the most recently received one thereof is available for the indicator means. Thus, always at least one empty memory block is available at the instant at which it is required, and the bookkeeping system again remains simple.

Preferably, when the ordering directions of said first and second linear ordering criteria are the same, the storage control device has the same address incrementation direction as the indicator means, and, when the ordering directions are not the same, the storage control device has the opposite address incrementation direction with respect to the indicator means. The merging of two lists having mutually different ordering directions is thus possible in a simple manner.

Preferably, the storage control device is connected to the serial operating memory input/output and to the indicator means in order to update, upon serial reception of said second elements on the memory connection, a second running write address within said (kmax−2) memory blocks, and also comprises detection means for activating, upon reception of the last one of said second elements or when the end of the last one of said (kmax−2) memory blocks is reached, the other elements of the control device and for activating, exclusively in the latter case, a repeat element for activating the storage control device again upon deactivation of the vacating means, the previously merged third elements then acting as first elements again. The serial reception of the second list is thus also possible, and it also becomes possible to process (very) long second lists. However, the processing time is thus increased, because a new cycle must be performed each time (moreover, the first list is longer during each subsequent cycle).

Preferably, the comparison means have a second state which arises upon activation of the device and which serves for the direct comparison of a second element indicated by the indicator means with a first element received on the serial memory connection so that said first state is activated only after the supply of a first element to the read/write memory. The first part of the first list is thus advantageously applied directly to the result list upon presentation.

BRIEF DESCRIPTION OF THE FIGURES

A preferred embodiment of the invention will be described in detail hereinafter. After a brief explanation of the state of the art, first a block diagram of the preferred embodiment will be described, followed by an illustration of a number of situations occurring during merging, and a detailed description. The foregoing will be based on the drawings in which.

PRIOR ART

Figure 1:
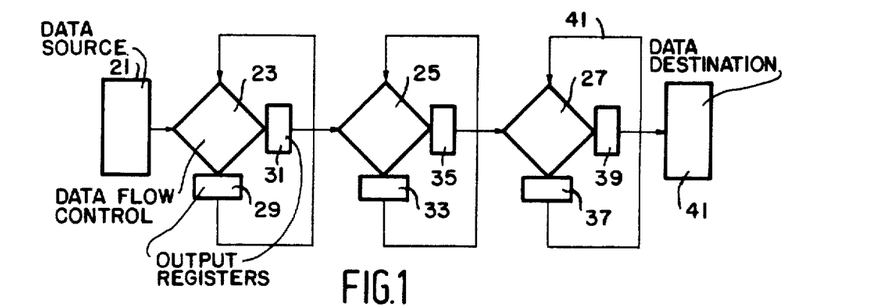
FIG. 1 is a block diagram of a device according to the present state of the art.

FIG. 1 shows a device in accordance with the present state of the art, notably as disclosed in U.S. Pat. No. 4,276,611. The list elements to be ordered are serially presented by a data source 21. The result list is serially presented to a data destination 41. The devices 21 and 41 may be serially operating memories, such as magnetic disc memories which are read and written at mutually equal speeds. The device furthermore comprises three data flow control elements 23, 25, 27 which are described in detail in said Patent. Each of the elements 23, 25, 27 comprises two output registers (29 to 39); one of each two is fed back to an input of the same data flow control element, while the other output register is included in series with a connection between the data source 21 and the data destination 41. During each operation cycle a list element is presented by the data source 21; furthermore, all registers 29 to 39 can contain at the most one list element. Assume that the result list must be ordered so that the smallest element is in the first position. The operation of the data flow control element 27 is then such that the list elements in the registers 35 and 37 are compared, the smaller one of these two list elements being applied to the register 39 while the larger one is applied to the register 37. When the list element in the register 37 is thus the larger, it is thus cycled once via line 43 and back to the register 37. In the opposite case, the same list element is applied to the register 39 via the line 43. The content of the register 39 is applied to the data destination 41. When the merging process is initiated, first the list B must be stored in the registers 29, 33, 37 and the first part of the list A must be stored in the registers 31, 35. The merging process may then commence. Thus, as many ordering operations are performed in parallel as there are elements of the list B. When the list B contains many elements, therefore, a complex device will be required.

DESCRIPTION OF A PREFERRED EMBODIMENT

Figure 2:
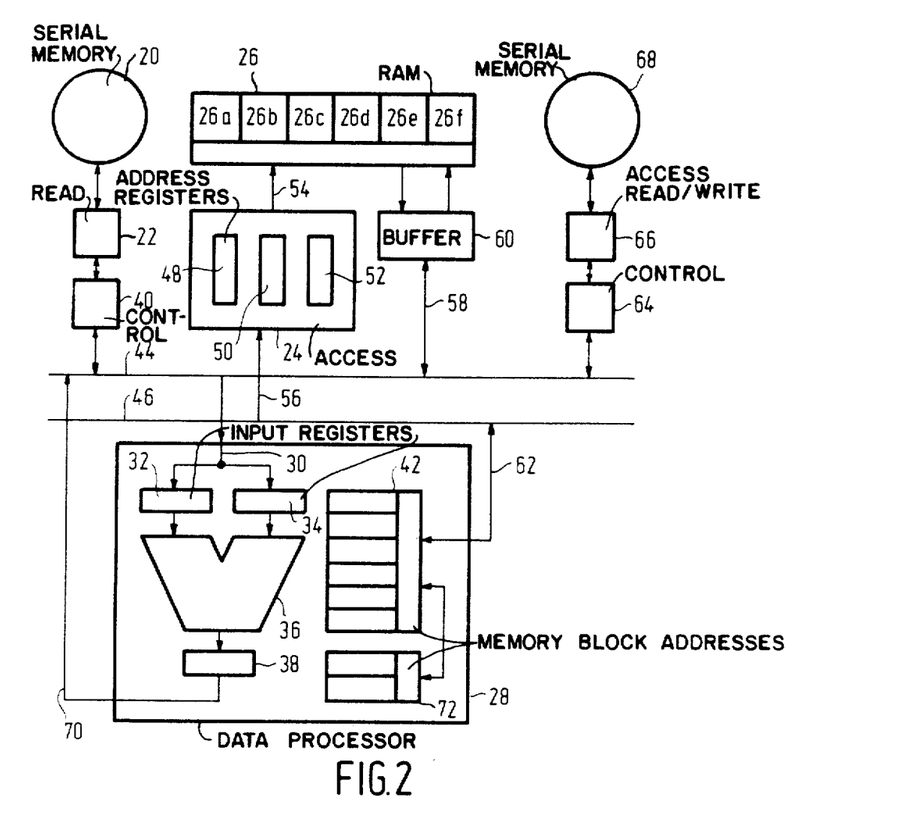
FIG. 2 is a block diagram of a device in accordance with the invention.

FIG. 2 is a block diagram of a device in accordance with the invention. Block 20 represents a conventional serial memory, for example a magnetic disc memory which comprises a drive and a speed control system which will not be elaborated upon herein. The list A is initially stored in this serial memory. The elements of the list A are successively read by an access-cum-read means 22, the data content being regenerated by regeneration amplifiers (not shown) and possibly a demodulator. Block 40 is the control device of the serial memory for eliminating discrepancies in the synchronization between the serial memory 20 and a bus line 44, for series/parallel conversion, and for the addressing in the memory 20. Block 24 is an access element for a random access read/write memory 26. Random access is to be understood to mean herein that the elements of the lists A, B stored in the memory 26 can be read in an arbitrary sequence. The access element 24 comprises three address registers, i.e. a register 48 for the first running write address or the second running write address, a register 50 for the first running read address and a register 52 for the second running read address. These three addresses can be applied to the read/write memory 26 as desired via line 54. The access element 24 is connected to an address bus 46 via line 56. The memory 26 is connected to the data bus 44 via the line 58. The memory 26 is divided into six equal-sized blocks 26a to 26f which together cover the entire memory. There is also provided a bidirectional data buffer 60. The number of memory blocks may be different. They may also be arranged in a different sequence and may also cover only a part of the memory. The actual data processing operations are performed in a processor 28. This may be a conventional microcomputer comprising an internal data and address bus, register and storage capacity, processing members and an appropriate control system. Only a part thereof is shown in the Figure. The comparison of the list elements is performed in the arithmetic and logic unit (ALU) 36. This unit is provided with two input registers 32, 34 which are connected to the data bus 44 via connection 30, and one output register 28 which is also connected to the data bus via connection 60 70. Each of the three registers can accommodate one list element, the ALU unit 36 conducting the list element having the lower term value of the two list elements in the registers 32, 34 to the output. At the same instant the registers (32, 34) wherefrom the list element has been conducted can be filled again via the data bus. Via the data bus, the conducted list element then travels to a serial memory 68 which comprises, in the same way as the serial memory 20, access-cum-read/write means 66 and a control device 64. The input registers 32, 34 can be filled either from the serial memory 20 or from the data buffer 60 of the read/write memory 26. The list elements can be applied from the memory 20 to the input registers 32/34 or to the data buffer 60. Instead of using a data bus, these data paths may alternatively be separate. The processor 28 also comprises a first block list updating device 42. This device contains a number of addresses which is equal to the number of memory blocks in the memory 26; these addresses contain the memory block addresses of the memory blocks containing successive elements of the first list; one of these addresses in the block list updating device 42 is indicated by an indicator (not shown). There is also provided a second block list updating device 72 which contains at the most two indicator data for the first block list updating device 42. When a memory block has been completely filled with elements of the list A and the next element of the list A is presented, the second block list updating device contains a valid indication for a memory location in the first block list updating device which indicates an entirely empty memory block. When a memory block containing elements A or elements B has been completely vacated, the indicator information for the address associated with this memory block in the first block list updating device is thus stored in the second block list updating device. When a memory block containing elements A has been completely vacated, the first block list updating device contains an indication for the next memory block containing one or more elements A (if present). The first and the second block list updating devices thus cooperate and, moreover, the first block list updating device cooperates with the address register 48 (first running read address). The registers 50, 52 also have an increment facility, and the address register 48 has an increment as well as a decrement facility, the latter facility being used when the list B and the list A are stored with mutually different ordering directions in their original serial memory. This will be explained later. The operation of the device will now be described with reference to FIG. 3. It is to be noted that the storage space of the first and the second block list updating devices may form a physical part of the memory 26 which is addressable via the address bus in FIG. 2.

EXAMPLE OF A MERGING OPERATION

Figure 3:
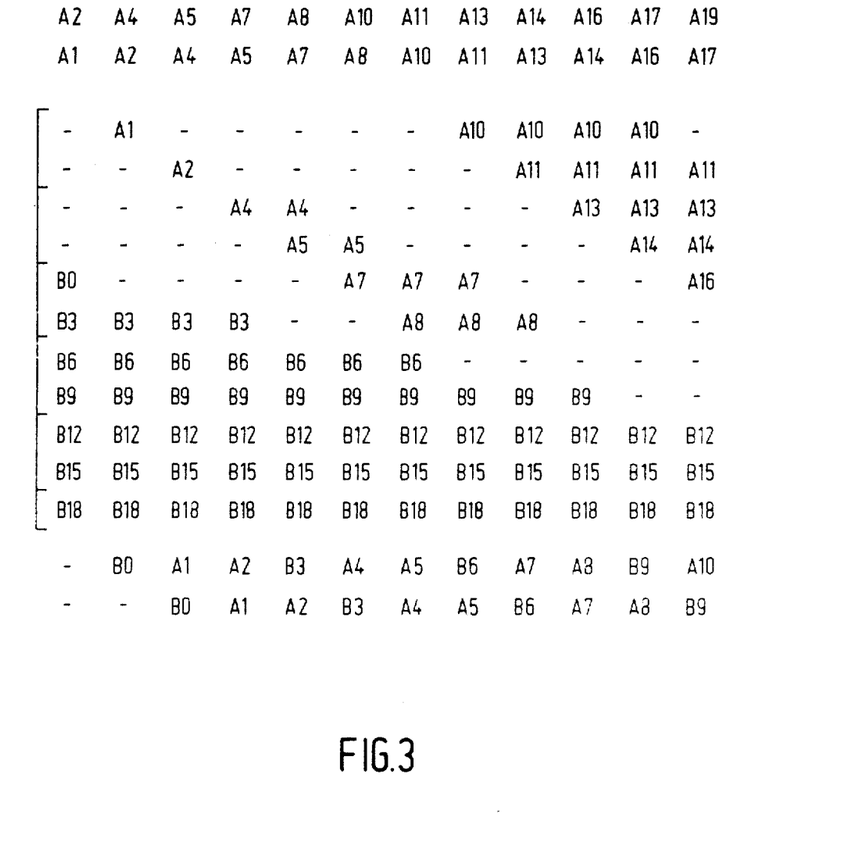
FIG. 3 shows a number of phases which may occur during the operation of such a device.

FIG. 3 shows a number of phases which can occur during the operation of the device shown in FIG. 2. In this case the memory blocks can each contain no more than two list elements. The elements of the list B are successively denoted as B0, B3, ... B18. The elements of the list A are A1, A2, A4, A5, A7 ... A23. Ordering is to be performed in accordance with the numerical value of the term. The extreme left-hand column illustrates the initial situation. At the top there are shown the first two elements of the list. A. The next four lines indicate that the first two memory blocks are empty (capacity for 2×2 list elements). The next seven lines (three blocks for two list elements each and one block for only one list element) contain the seven elements of the list B stored in the read/write memory. The last two lines show the two most recently outputted elements of the result list; initially, therefore, these lines are empty. In practical cases the number of list elements per memory block will be much larger. For example, there may be a read/write memory of 4 k word of 16 bits, and two words may be required for each list element. Attractive block lengths then comprise, for example, from 10 to 20 list elements. After presentation of the first element A1 of the list A, the second column is formed in which element B0 is applied to the result list. It will be seen that each time an element A is positioned in the last position of a memory block, at least one memory block is vacant for the storage of further elements A. Thanks to the choice of the block length, then one memory block is always completely vacant, but this will not always occur at all other instants. Thus, the input registers of the ALU unit 36 of FIG. 2 always contain one element of the list A and one element of the list B.

DEFINITIONS

Hereinafter some definitions will be given for a better understanding of the flow charts to be described later. First the linear ordering criterion will be defined for the value range W. The linear ordering criterion may be defined, for example, for the real numbers as "smaller than" or "larger than". It may also be defined for all words consisting of letters as "in alphabetical order", for all complex numbers as "having an absolute value smaller than", etc. The first list is defined as:

$A(0: (imax-1))$ so that $\forall i \, N, 0 \leq i \leq imax-1 \rightarrow A(i) \, W$, and $\forall i \in N, 0 \leq i \leq imax-2 \rightarrow A(i) \leq A(i+1)$.

This list thus contains a number (imax) of elements which all have a sequence number i (natural number) and a term A(i) in a value range W. The list is ordered according to the terms. For A (i)=A(i+1), the list may also contain elements having the same term value; these need not always be identical elements. The second list is defined similarly:

$B(0: (fmax-1))$, so that $\forall f \, N, 0 \leq f \leq fmax-1 \rightarrow B(f) \, W$, and $\forall f \, N, 0 \leq fmax-2 \rightarrow B(f) \leq B(f+1)$.

This list thus comprises a number (fmax) of elements, while B(f)=B(f+1) may or may not be permissible. The result list to be formed is defined similarly:

$Z(0:(tmax-1))$, so that $\forall i; Z(t)=A(i)-A(i)$ or $f; Z(t)=B(f)$, and $\forall t \in N, 0 \leq t \leq tmax-2 \rightarrow Z(t) \leq Z(t+1)$.

Therefore, if an element Z (t) exists, it must originate from one of said lists. The result list may comprise elements having the same terms. On the other hand, when elements having the same term value occur in the two original lists, it may be that only one is taken up in the result list or that more than one is taken up in the result list. After the foregoing, moreover, a reversed list B is defined:

$BREV (0: (fmax-1))$, so that $\forall f \, N, 0 \leq f \leq fmax-1 \rightarrow BREV(f)=B(fmax-1)$.

When equal term values are not permissible, A (i) < A (i+1) is applicable in the foregoing case, and likewise for the other lists. A random access read/write memory (RAM) may be considered as: $M(0: (jmax-1))$, where $0 \leq j \leq jmax-1$. The index j indicates the address; the value of M(j) indicates the data stored at the address j. A number of memory blocks within the read/write memory is defined as follows:

$SM [0: (kmax-1), 0: (lmax-1)]$, so that $\forall k, l \, N, 0 \leq k \leq kmax-1$ and $0 \leq l \leq lmax-1 \rightarrow SM$ $(k, l) = M (k*lmax + l)$ The value of lmax indicates the number of liest elements which can be accommodated within one block. Thus, in this case memory blocks having a fixed length are used. It has already been stated that this is not a strictly necessary condition. The value of kmax indicates the number of blocks available for the operation in the read/write memory. This memory may also comprise further blocks (for example, having the same length lmax) which are reserved for other purposes. The part of the memory which is actually used is defined as follows (available capacity smaller than lmax is not used):

$jmax = kmax*lmax$.

The boundary of a block SM (kr) is formed by the memory address jr, so that jr=kr*lmax (which is, therefore, the first address of the relevant memory block). For the actual serial merging process, the list B must be loaded into the read/write memory up to a maximum of gmax=(kmax−2)*lmax list elements, because two vacant memory blocks must be available before the merging process may commence. When fmax≦gmax, the entire list B can be loaded and the merging process can be performed in one operation; the flow chart of FIG. 4 also allows for the opposite case. A start list of the list B is defined as follows:

$SB (0: (gmax-1))$, so that $\forall g \, N, 0 \leq g \leq gmax-1 \rightarrow SB(g) = B(g)$, and also an end list of the list B is defined as:

$EB (0: (frmax-1-gmax))$, so that $\forall f \, N, 0 \leq f \leq (fmax-a-gmax) \rightarrow EB(f) = B(f+gmax)$.

For the storage of the ordered list B it is assumed that the elements thereof are initially stored in a serial memory between a start address "begb" and an end address "endb". Whenever applicable, the same assumptions also hold good for the lists BREV and also for B* and BREV* (the asterisk indicates that no list elements having the same term value occur). If fmax≦gmax, B=SB (first part of list B). If fmax>gmax only the first "gmax" elements of the list B will fit in SB; the remainder of the list B, EB, which can be stored in the read/write memory only later, will be present in the serial memory as from the address (begb+gmax). The (sub) list SB is stored in the read/write memory M(j), so that $$\forall\ g\ N;\ 0\leq g\leq gmax-1 \rightarrow M(2*lmax+g) = SB(g)$$

The first two memory blocks thus remain unused. If as an alternative the serial memory contains the list BREV, the storage in the read/write memory M(j) will be performed as follows:

$$\forall g\ N;\ 0\leq g\leq gmax-1 \rightarrow M(jmax-1-g) = SBREV(g)$$

in which SBREV represents the first, at the most gmax elements of the list BREV.

After the storage of the list B, or the first part SB thereof, in the read/write memory, the list A is supplied from the serial memory. The first element of the list A (a∈A) to be stored in the memory is stored at the boundary of a vacant block SM (k, o), for which k can be chosen at will. All subsequent elements of the list A must then also be stored in the read/write memory, because there is at least one element which is present or must be taken up sooner in the merged list and which also disappears sooner from the read/write memory than a list element which arrives later. For the first list (A) the read/write memory then acts as a first-in-first-out (FIFO) buffer. The memory blocks are completely filled in succession; write as well as read operations can be performed in the same memory block in as far as the list A is concerned (see FIG. 3 at the transition between the second and the third column). The bookkeeping of the storage of the list elements a∈A in the read/write memory takes place in a bookkeeping list ISM which contains the succession of memory blocks in which elements of the list A are stored:

ISM (0: (umax−1))

$\forall$ k∈u 1; value SM(k, l) A→ISM(u)=k*lmax.

The boundary of each memory block containing at least one element of the list A is stored in the list ISM. Because the number of blocks in the memory M at the most equals kmax, the number of list elements of the list ISM, umax, need not be larger than:

umax = kmax.

The number of successive blocks containing elements of the list A used for one serial merging operation depends only on the number of list elements in the list A, and may in principle be infinitely large. Therefore, a sequence function is defined: UNEXT within the list ISM:

if u≠umax−1, then UNEXT (u)=u+1 otherwise UNEXT (u)=0.

When two elements of the list A, ai and a(i+1), are both stored in the read/write memory so that ai = M(ji) = M(ISM(ui)+li), a (i+1) is stored at address j(i+1) for which: if l(i) < lmax−1, j(i+1) = j(i)+1.

However, if l(i) ≧ lmax−1, j(i+1) is found as:

j(i+1) = ISM(UNEXT(u(i))).

THE GENERAL FLOW CHART

Figure 4:
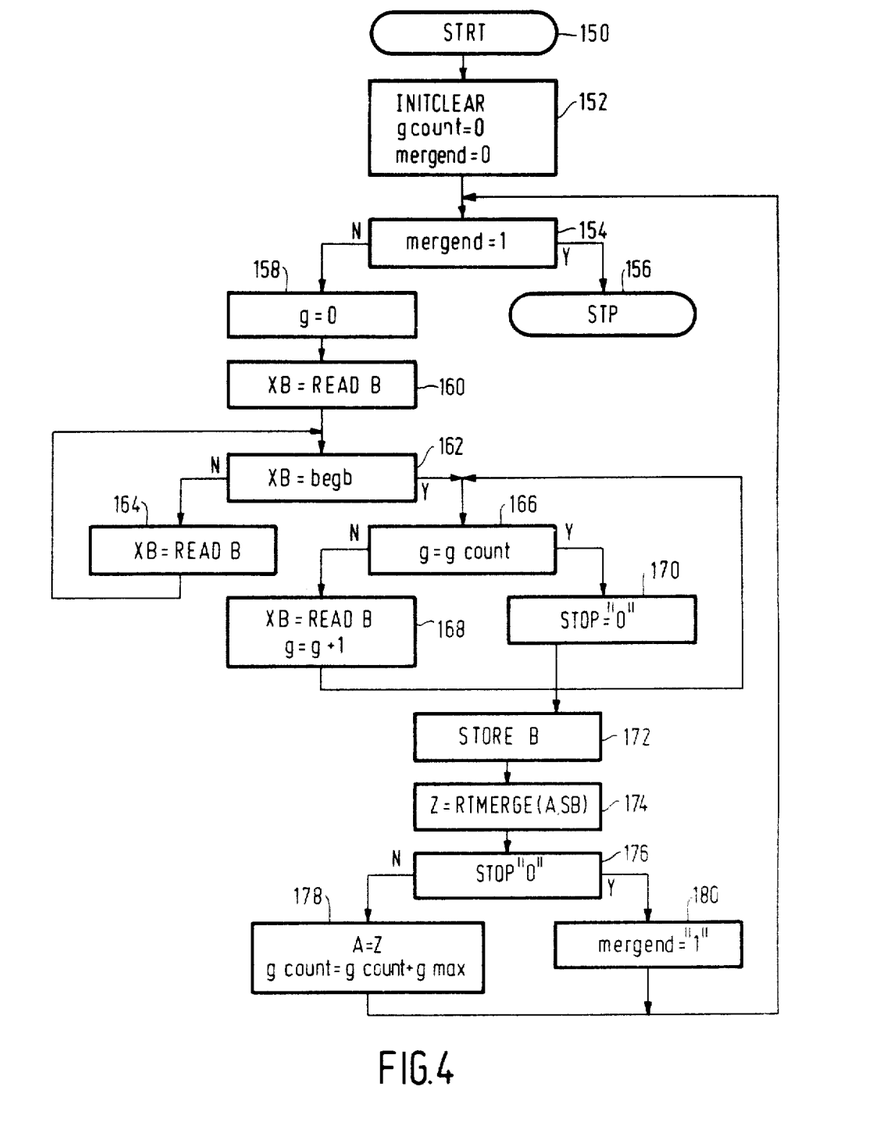
FIG. 4 is a general flow chart of a merging operation.

FIG. 4 is a general flow chart for the merging operation. This flow chart concerns the storage of the first part SB of the list B; it activates the actual serial merging operation RTMERGE which is shown in detail in FIG. 6; it comprises a repeat loop for merging the second part EB of the list B with a list A in which the first part SB of the list B has already been included. The following variables are defined:
  a. The signal bit "stop" is true only if the first part of the list B: SB≠B is stored in the read/write memory.
  b. The signal bit "mergend" is true only if all list elements b of the list B have been processed.
  c. XB controls the reading of an element of the list B.
  d. gcount defines the beginning of the end part EB of the list B in each cycle.

All blocks of the flow chart are shown as rectangles except for the start and stop blocks. In start block 150 the system is initialized; for example, the available part of the read/write memory is declared. In block 152 the variables are set to the initial values and the content of the part of the read/write memory to be used is invalidated. Furthermore, the variables gcount and mergend are made equal to zero. Block 154 is a test block which is also shown as a rectangle. The difference with respect to a processing block consists in that there are two outputs. When the variable "mergend" has the value 1, the system proceeds to block 156 and the operation has been completed. In block 156 the variables are invalidated, the part of the read/write memory used is released and further termination operations are executed. When the variable "mergend" has the value "0" (N), the variable g is made equal to zero in block 158 and in block 160 a read operation is performed in the serial memory in which the list B is stored. In block 162 it is tested whether the address just read is the first address of the list B. If this is not so (N), the next address of the same serial memory is addressed in block 164, after which the system proceeds to block 162. Ultimately the first address of the list B will be addressed. The double appearance of the operation shown in block 160/164 is simpler in many programming languages than a direct return from block 162 to block 160. The second output of block 162 is connected to block 166 in which it is tested whether the sequence number of the element of list B read corresponds to the sequence number of the first element of the list B (or SB) to be treated. If this is not so, the next element of the list B is read in block 168 and the sequence number value is incremented. The system subsequently returns to block 166. In this example it is assumed that the read operation in the serial memory is non-destructive. Ultimately, the test in block 166 will be affirmative (Y). In that case the bit "stop" is made equal to "0" in block 170. Subsequently, in block 172 the procedure "STORE B" is addressed in order to fill the reserved number of memory blocks with elements from the list B in as far as this is possible. This procedure will be described in detail with reference to FIG. 5. Subsequently, in block 174 the procedure Z=RTMERGE (A, SB) is addressed in order to perform the actual merging operation. This procedure will be described in detail with reference to FIG. 6. After completion of the latter procedure, it is tested in block 176 whether the bit "stop" is still the same. If this is not the case (N), the list B has not yet been completely processed. In that case the variable "gcount" is updated in block 178, so that the next operation (in block 166) commences only with the remaining part of the list B. Furthermore, the original list A is now replaced by the provisional, merged list Z which is composed of the list A and the list SB prevailing thus far. However, if the "stop" bit is still "0", the bit "mergend" is set to "1" in block 180 and the procedure is terminated via blocks 154, 156. The construction utilizing the blocks 154, 180 results in a simple program implementation. In other situations they could be omitted so that the place of the block 180 is taken by the block 156.

THE STORAGE OF THE LIST B

One of the following four lists is supplied from the serial memory: B, BREV, B*, BREV*. The following variables are now defined:

"reversed B" is exclusively true if the list BREV or BREV* is concerned. The memory address JB is the address at which the first list element b will be stored. The memory address JE is the last memory address available, so that gmax list elements are to be stored. SXB is an auxiliary variable which will be described in detail hereinafter. The binary variable RB is (exclusively) true if the read/write memory contains at least one list element of the list B.

The loading of the list B into the read/write memory is terminated when one of the following two situations occurs:

1. XB=endb (stop remains "0"), which means that the last list element of the list B is stored at the address XB.
2. g=gmax, so that a part of the list B cannot be accommodated in the read/write memory; this part must be treated during the next cycle during which a supplemented list A is presented. When the read/write memory has been loaded, the following parameter variables are evaluated for the procedure RTMERGE (FIG. 4, block 174):

"minb" is the index (memory address) of the list element in the read/write memory having the smallest term value; when there are several list elements having the same term values this is the list element which is to be treated first, for example as a result of the ordering in the read/write memory; "bmin" is the boundary (first block address) of the memory block in which this list element having the smallest term value is stored; it is assumed that ordering takes place according to increasing term value. See hereinafter for the definitions of "maxb" and "bmax". The variable "nb" represents the number of list elements stored in the memory block identified by bmin; "maxb" is (in this case) the memory address of the list element having the largest term value in the read/write memory.

The procedure TEST is activated, when appropriate, for the testing of the ordering during input and also for testing for the absence of duplicates (list elements having mutually equal term values) when the list B* or BREV* is concerned.

Figure 5:
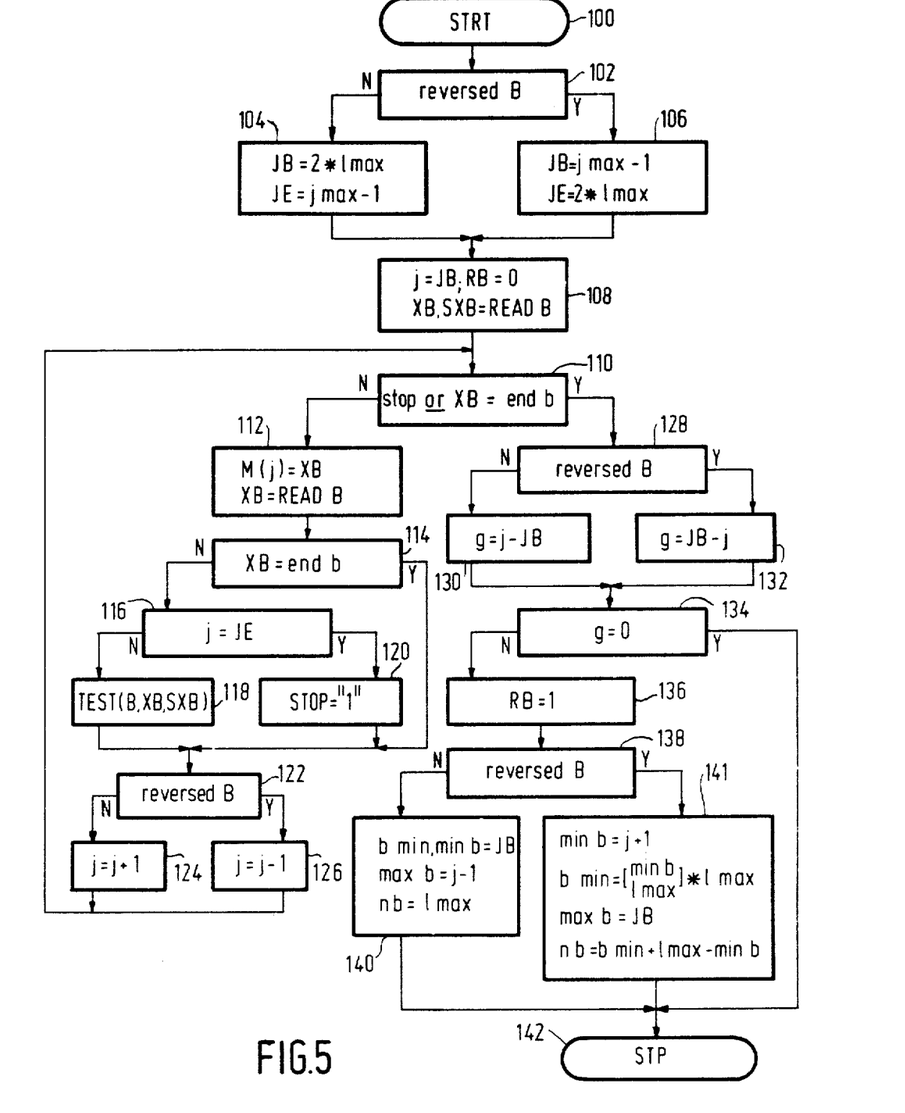
FIG. 5 is a flow chart for the storage of the second list B in the main memory.

FIG. 5 is a flow chart for the storage of the list B in the read/write memory. This is the procedure of FIG. 4, block 172. In block 100, the initial declarations etc. take place. In block 102 it is tested whether the list B has already been stored in the correct sequence in the serial memory, that is to say in the same form of sequence as the list A. When the sequence is correct, the start address JB and the end address JE are declared in block 104; the first two blocks of the available part of the read/write memory are then left vacant. The ordering direction within a memory block, for example according to increasing term value, thus is the same for both lists A, B. If the "wrong" order prevails for the list B, the start address and the end address are declared in interchanged form in block 106.

In block 108 the running variable j is made equal to the start address of the list B; the variable RB becomes "0"; in that case no elements of the list B are present in the read/write memory. Furthermore, the values of the variables SXB and XB are determined by the reading of the first element of the list B.

In block 110 it is tested whether the bit "stop" is true or whether the variable XB, forming the index of the list element just read, indicates that this is the last element of the list B. If one of the two conditions tested is true, the system proceeds to block 128; otherwise it proceeds to block 112. In block 112 the element XB just read is stored at the first vacant location of the memory section available for the storage of the list B, and the next element of list B is read from the serial memory. In block 114 it is tested whether the element just read is the last element of the list B. If this is not so, it is tested in block 126 whether the memory address is the last address made available. If this is so, the bit "stop" is set to "1" in block 120. In the opposite case, the procedure TEST (B, SB, SXB) is performed in block 118.

During the procedure TEST (S, W1, W2), errors (if any) are detected and if any are present the execution of the program is stopped. The variable S may represent a set (s) whose elements must all be mutually different, or a "bag" (BH) where several list elements may have the same designation. The ordering may be "normal", i.e. according to increasing term value (0), or reversed, so according to decreasing term value. An error occurs in the relevant one of the four following cases:

With (S, 0) if $W1 \leq W2$
With (S, R0) if $W2 \leq W1$
With (H, 0) if $W1 < W2$
With (H, R0) if $W2 < W1$.

If no error occurs, W2 is made equal to W1. The further treatment of an error will be omitted for the sake of simplicity. Th ordering is error-free in many cases and the block 118 may be omitted. In block 122 it is tested whether the ordering is normal or reversed. The running memory address is updated in the blocks 124, 126.

Block 128 is reached when either the serial list B is exhausted or the space available in the read/write memory has been completely filled; it is then tested whether or not the ordering is reversed. In the blocks 130, 132, the number of elements g of the list B is calculated from the address JB and the running address j. This variable g will be used later. In block 134 it is tested whether this number equals zero; if this is so, no further steps need be taken and the system can proceed, via block 142, to block 174 in FIG. 4.

If $g \neq 0$, the variable RB is made equal to 1 in block 136 in order to signify that the merging operation with the list B is feasible. In block 138 it is tested again whether the ordering of the list B in the serial memory is reversed. If this is not so, in block 140 both variables bmin, minb are made equal to the start address in the read/write memory in which the first element of the list B to be treated is stored. Furthermore, the memory address of the last element to be treated of the list B in the read/write memory is made equal to the running address −1 (compare the possibly last operation in block 124). Finally, the number of elements to be treated of the list B in the first memory block to be treated is made equal to the length of this memory block.

In the opposite case, the relevant variables are declared in block 141. The value of minb becomes 1 larger than j (compare the operation in block 126). The value of the first block boundary bmin is calculated as the block number multiplied by the block length lmax. The block number is the quotient of the address bmin and the block length lmax which has been rounded off downwards to a whole number. The last address to be treated in the read/write memory is made equal to the address of the first element of the list B written. Finally, the number of list elements in the first block of the B list to be treated (filled by starting from the rear) is calculated; (minb-bmin) is the number of vacant list element positions therein. After the blocks 140, 141, the system returns to block 174 in FIG. 4 via block 142.

Figure 6:
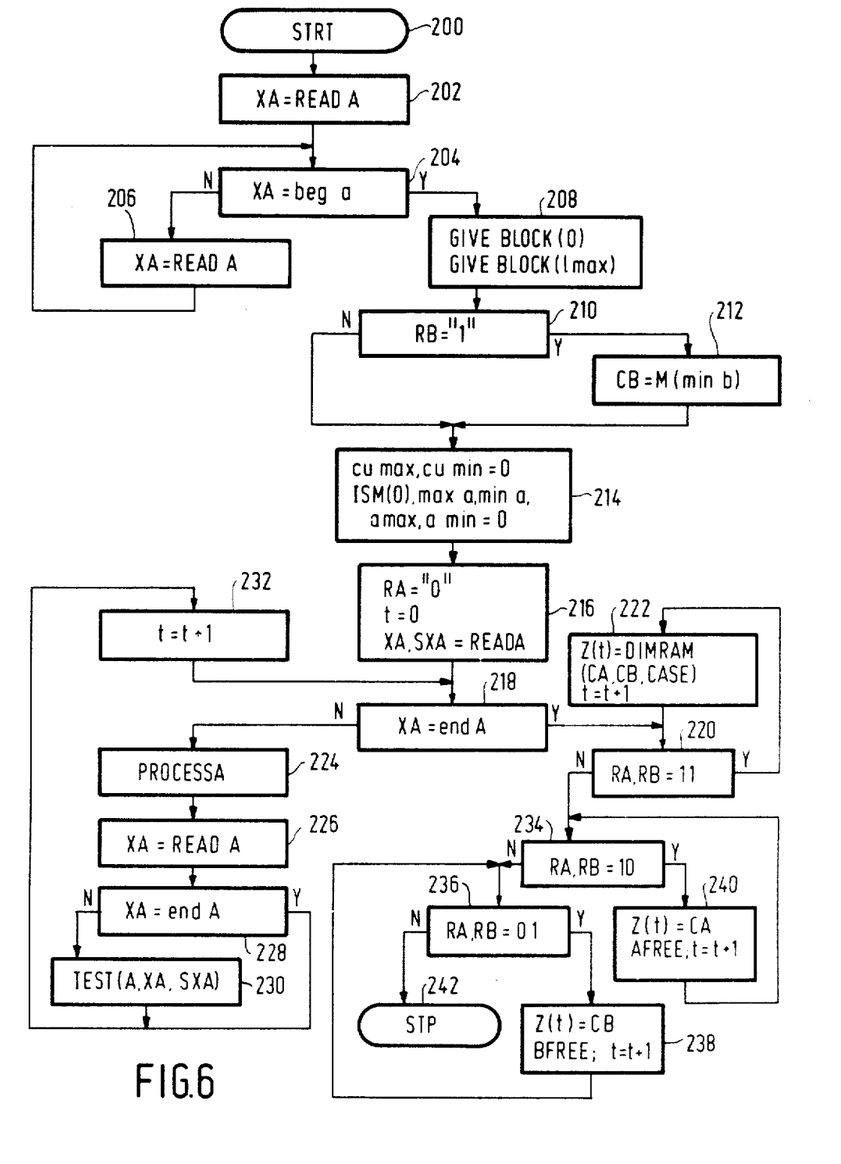
FIG. 6 is a flow chart for the actual serial operations during merging.

FIG. 6 is a flow chart for the actual serial operations during merging. Initialization takes place in block 200. The following variables are declared:

XA which is the read variables for the list A (from the serial memory);

bega, enda concern the first and the last addresses of the ordered list A in the serial memory;

RA is a binary variable which is true exclusively if the read/write memory contains at least one list element of the list A;

SXA is an auxiliary variable which is used during the procedure TEST.

The blocks 202, 204, 206 correspond to the blocks 160, 162, 164 of FIG. 4, but now concern the list A. The blocks 208, 210, 212, 214 concern the procedure INITRTM. The latter procedure consists of two parts, that is to say a part which is necessary and a further part which is only implemented in order to increase the processing speed. The following variables are declared in this procedure:

CB:
if RB="0", it is not used;
if RB="1", it has the value M (minb),
which is, therefore, the term value of the first element of the list B;

mina, maxa are the memory addresses in the read/write memory in which the smallest element and the largest element, respectively, of the list A are stored;

amin, amax are the block boundaries (first address of the relevant block containing the memory addresses mina and maxa, respectively);

cumin is the memory location in the list ISM in the first block list updating device wherefrom the address amin is indicated;

cumax similarly is the memory location in the list ISM wherefrom the address amax is indicated.

In block 208 the memory blocks "0" (first address in read/write memory is "0") and block "lmax" (so the next block) are assigned. This procedure "GIVEBLOCK" for the second block list updating device will be explained in detail with reference to FIG. 13. These two blocks are thus available for the list A. In block 210 it is tested whether the variable RB has the value "1" (this "1" is formed in block 136 in FIG. 5). If this is so, the variable CB is assigned in block 212. Subsequently, in block 214 seven variables are made zero. It is to be noted that, of these seven variables, cumin and cumax are memory addresses in the list ISM; the other five variables, however, are memory addresses in the read/write memory M itself. After block 214, the initialization of the procedure RTMERGE has been completed.

Subsequently, in block 216 the binary variable RA is set to "0" (the read/write memory does not yet contain an element of the list A) and the variable t is also made equal to "0" (t is the element under number for the merged list Z). Finally, the variables XA and SXA obtain the values read from the serial memory. In block 218 it is tested whether the relevant list element represents the last address of the list A. If this is not so, the procedure PROCESSA, which will be described in detail with reference to FIGS. 7a to 7d, is performed in block 224. In block 226, the next element of the list A is read and in block 228 it is tested whether this is the last element of the list A. When the test result is negative (N) the procedure TEST(A, XA, SXA) is performed in block 230. Subsequently the list number of the merged list is incremented by 1 in block 232. Steps 218 and 224-232 are repeated until it is detected in block 218 that the list A has been exhausted. Thus, the actual merging operation is performed in the blocks 218, 224, ... 232. After completion of this operation, the read/write memory may still contain useful elements for the list to be merged. The blocks 220, 222, 234-240 contain the procedure EMPTYRAM which clears the read/write memory.

In block 220 it is tested whether the read/write memory still contains elements of both lists A, B. If this is so, in block 222 the smallest thereof is added, by way of the procedure Z(t)=DIMRAM, to the merged list and the index t is incremented. When one of the two original lists has been exhausted, it is first tested in block 234 whether the list B is concerned. If this is so, in block 240 the smallest element of the list A is taken as the list element of the merged list, and the procedure AFREE is performed. This procedure will be described with reference to FIG. 9. However, if it is detected in block 234 that the list A has been exhausted, the system proceeds, via block 236, to block 238 in which the remainder of the list B is processed in the same way as in block 240. This procedure will be described in detail with reference to FIG. 8. Finally, both lists are exhausted and the system proceeds to the termination block 242 and subsequently to the block 176 of FIG. 4.

It is to be noted that a counter part of the block 230, be it for the list B, has been described as the block 118 in FIG. 5.

The FIGS. 7a, 7b, 7c, 7d illustrate the procedure "PROCESSA" performed in block 224 for various situations. The result of this procedure is the addition of one element to the merged list Z. A change of state may then occur in the organization of the read/write memory. These changes of state depend on the objects imposed. When list elements having the same term values are permissible, for example:

$$a(i)=a(i+1)= \ldots =a(i+p-1)=b(j)=b(j+1)= \ldots =b(j+q-1),$$

the following may be applicable:

$$z(t)=z(t+1)= \ldots =z(t+r-1)=a(i)$$

and the following cases may occur, for example:
1.1: r=p+q (all are taken over)
1.2: r=max (p, q)
1.3: r−1

When the lists A, B do not contain list elements having the same term values, selections can also be made for the merged list:

If a(i)=b(j), the following cases may occur:
2.1: $z(t)=a(i) \rightarrow z(t\pm 1) \neq a(i)$.
2.2: t for which $z(t)=z(t+1)=a(i)$.

Also defined is a variable CA which is the value of the smallest element of the list A in the read/write memory which, therefore, must be treated first. If RA=0, CA is undefined. Also defined is na=amin+−lmax−mina, which is the address distance between the address of the smallest element of the list A and the end of the memory block in which this smallest element is stored; (mina−amin) is the number of addresses already treated (compare block 141 in FIG. 5).

Also defined are:

tna=maxa−amax+1; therefore, this is a counter which follows the storage of elements of the list A in a block. If amin≠amax, "na" is the number of elements in the block amin, and "tna" is the number of list elements in the block amax.

The following changes of state may occur in the case (2. 1) where the merged list does not contain elements having the same term values.

| (RA, RB) | z (t) condition(s) |
|---|---|
| (1) 00→00 | XA g = 0 |
| (2) 01→00 | XA g = 1 and XA = CB |
| (3) 01→10 | CB g = 1 and CB < XA |
| (4) 01→11 | CB g = 1 and CB < XA |
| (5) 01→01 | XA g = 1 and CB = XA or XA < CB |

These are the initial changes of state. In later stages, the following changes may occur:

| (RA, RB) | Z (t) conditions |
|---|---|
| (6) 00→00 | XA read/write memory empty. A list not exhausted |
| (7) 11→11 | CA CA < CB |
| (8) 11→11 | CB CB ≦ CA and g > 1 |
| (9) 11→10 | CB CB ≦ CA and g = 1 |
| (10) 10→10 | CA A is read and written at the same time |
| (10→00) can occur only during the Procedure "EMPTYRAM", FIG. 6, bottom right. | |

A further example is the case (2.2). The changes occur as above, except for the change (2) which does not occur; the change (6) is associated only with the initial condition and for the change (5) the condition is XA≦CB.

Figure 7A:
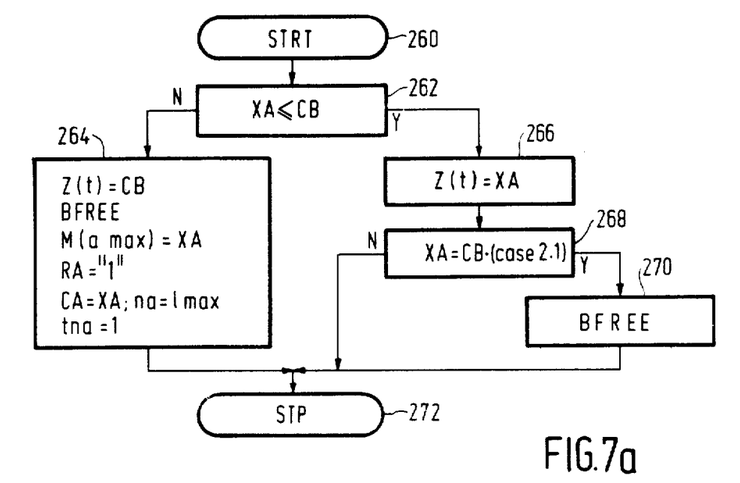
FIGS. 7a, 7b, 7c, 7d show the elementary functions of the comparison means and implications thereof.

FIGS. 7a–7d show the selection of the list element for the list Z (t) and the subsequent implementation of any change of state in the read/write memory, that is to say for the above cases 2.1 and 2.2. FIG. 7a concerns the case where (RA, RB)=(0,1). Thus, the read/write memory does not contain any element of the list A. After initiation of the procedure in block 260, the values of XA and CB are compared in block 262. When the value of CB is the smaller value, it is taken as the next element of the result list (block 264). Subsequently, the procedure BFREE (to be described with reference to FIG. 8) is addressed, because a memory block of the list B may have become available. The memory address (amax) of the first memory block reserved for the list A is then filled with the list element XA, and the bit RA is set to "1". The address distance between the element of the list A just written and the end of the first block to be treated is then lmax (the block contains only one list element). Moreover, it is indicated that exactly one list element is present in the memory block in which the largest element of the list A is stored (tna=1).

The second output of block 262 leads to block 266. Therein, the list element XA just read from the serial memory is added to the merged list. In block 268 it is tested whether the list elements XA and CB are equal and, moreover, whether the merged list may not contain elements having the same term values (case 2.1). If this is so, the list element CB is invalidated by way of the procedure BFREE to be described with reference to FIG. 8 (block 270). Block 272 forms the termination of the procedure PROCESSA.

Figure 7B:
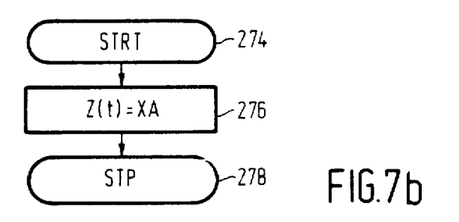

FIG. 7b shows the case where RA, RB=00, which means that the read/write memory is completely empty. Except for the start and end blocks, this procedure comprises only the block 276 in which the list element just read is added to the merged list (as in block 266, FIG. 7a).

Figure 7C:
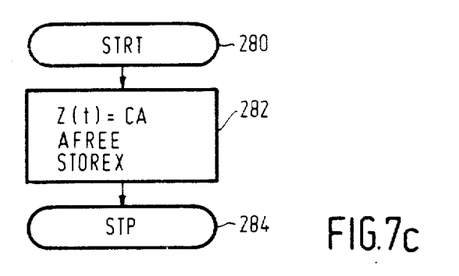

FIG. 7c shows the case where the read/write memory contains only one or more elements of the list A. The read/write memory is then controlled as a first-in-first-out (FIFO) memory. Except for the start and end blocks, this procedure comprises only the block 282; therein, the element CA of the list A which is to be treated first is added to the merged list. Subsequently, the procedure AFREE is performed; this procedure will be described with reference to FIG. 9. Finally, there is performed the procedure STOREX which will be explained with reference to FIG. 10.

Figure 7D:
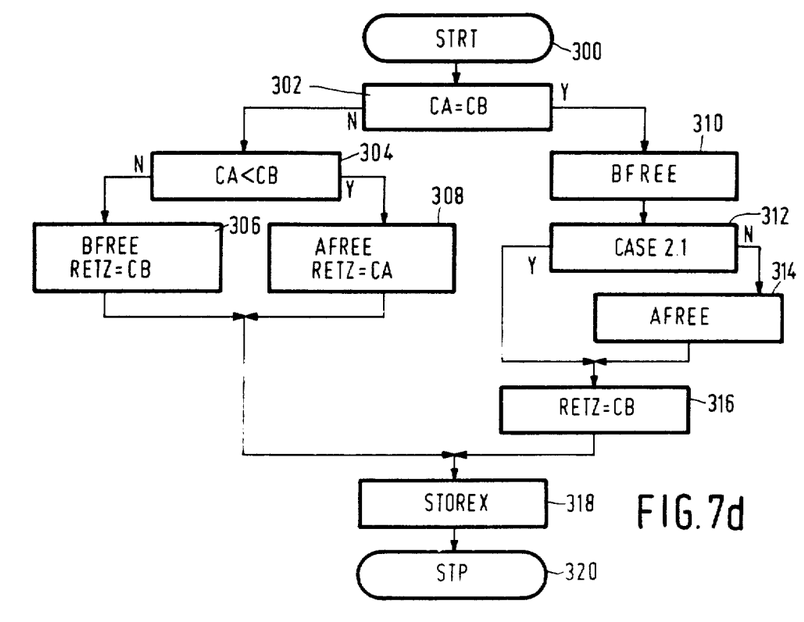

FIG. 7d concerns the most complex case in which RA, RB=11, so that the read/write memory contains elements of the list A as well as of the list B. After the start block 300 the procedure DIMRAM (CA, CB, CASE) is performed in the blocks 302 to 316; according to this procedure, the smallest element is selected from the list elements stored in order to be added to the merged list, the status of the memory blocks being updated at the same time, if necessary.

In block 302 it is detected whether the elements CA and CB of the two lists which are to be treated first have mutually the same term values. In block 304 it is detected whether CA is smaller than CB. The blocks 306, 308 are the counterparts of one another. If CB<CA, in block 306 the procedure BFREE is performed and the relevant list element whose term value is CB is stored in the special output register RETZ. If CA<CB, in block 308 the procedure AFREE is performed and the list element having the term value CA is stored in the register RETZ. When the two list elements have the same term value (block 302: Y), the procedure BFREE is performed in block 310. Together with the block 316, the block 310 corresponds to the operations in block 306. In block 312 it is detected whether the list Z(t) may contain duplicates. If this is so (Y), in block 316 the first element of the list B is applied to the output register RETZ; an element B thus has priority over an element A having the same term value. The relevant element A will then be dealt with in block 308 at a later stage. If the result list may not comprise duplicates, the procedure AFREE is performed in block 314, so that the relevant element A is no longer treated thereafter. The number of valid list elements stored in the read/write memory is thus reduced by 1. Finally, in block 318 an element is added to the list Z(t) and the system returns to block 226 in FIG. 6 via the termination block 320.

Figure 8:
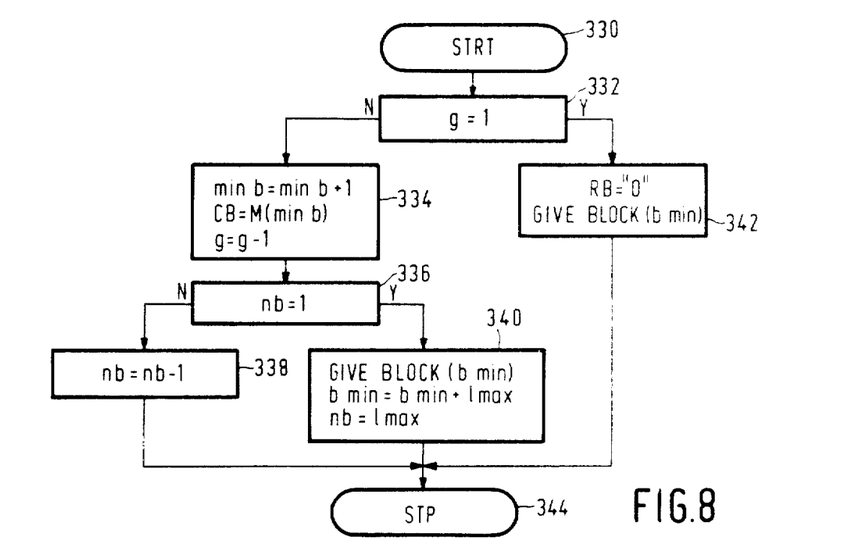
FIG. 8 is a flow chart for the updating of the second running read address.

FIG. 8 illustrates the procedure BFREE during which the bookkeeping for the list B is updated in order to take into account the fact that a list element is added to the result list. If necessary, a memory block may be made available for the second block list updating device. In block 332 it is detected whether the value of g=1, which means that the relevant list element is the sole element of the list B in the read/write memory. In block 342 the variable RB is then made "0" and the relevant memory block is released during the procedure GIVEBLOCK (bmin). If g≠1, the address of the next smallest element of the list B to be treated is incremented by 1, the address of CB is indicated and the variable f is decremented by one unit.

In block 336 it is tested whether the variable "nb" has the value 1. "nb" is the address distance between the actual element B and the end of the relevant memory block (this block need not necessarily be filled completely with elements of the list B up to the end). If nb=1, the relevant memory block contains only one list element and when this last element is read, the block is vacated by way of the procedure GIVEBLOCK (bmin) which will be described with reference to FIG. 13. Furthermore, in block 340 a change-over is made to the next memory block of the list B; the block boundary is shifted: bmin=bmin+lmax, and the address distance from the end of the relevant memory block becomes equal to the length thereof: lmax. Block 344 is the termination block again.

Figure 9:
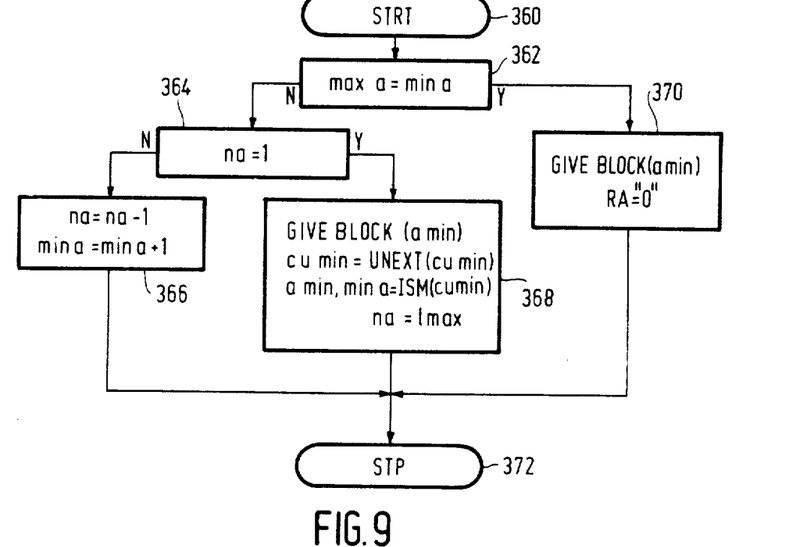
FIG. 9 is a flow chart for the updating of the first running read address.

FIG. 9 shows the procedure AFREE during which the bookkeeping of the list A is updated in order to take into account the fact that a list element is added to the result list. If necessary, a memory block may be made available to the second block list updating device. In that case the memory block to be addressed next is found by activation of the first block list updating device, because the successive memory blocks need not contain directly successive addresses. After the start block 360, it is tested in block 362 whether the first and the last list element are the ssme (same address). If this is so, the memory block is released in block 370 and the bit RA is updated. Otherwise, it is tested in block 364 whether the relevant memory block (in which reading is performed) contains only one element. If this is not so, in block 366 the actual address "mina" is incremented and the distance from the end of the relevant memory block is decremented: na=ng−1. If the relevant memory block contains only one list element, it is released in block 368: GIVEBLOCK (amin). Furthermore, the next memory block to be treated is selected. First the memory block index is updated by way of the procedure UNEXT which will be explained with reference to FIG. 11. Subsequently, the variables amin, mina are indicated at the indicated location of the first block list updating device and the address distance from the end of the relevant memory block is adjusted to the maximum value: na=lmax.

Figure 10:
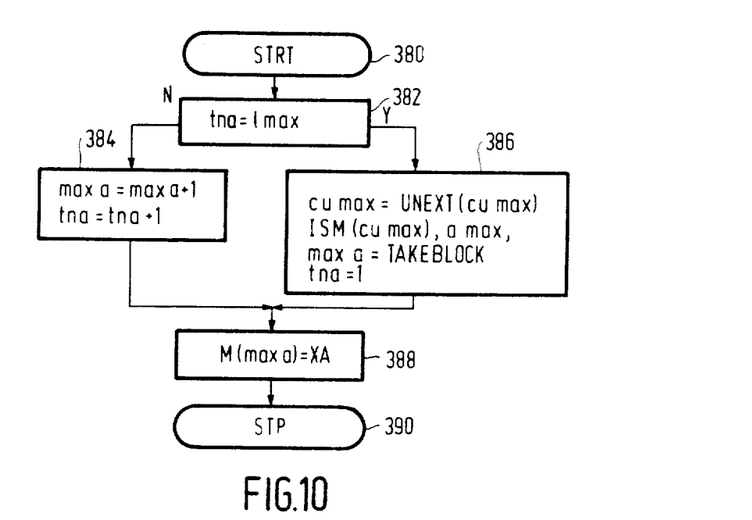
FIG. 10 is a flow chart for the updating of the first running write address.

FIG. 10 shows the procedure STOREX during which the bookkeeping of the list A is updated in order to take into account the fact that a list element from the serial memory is stored in the read/write memory. If necessary, a memory block may be fetched from the second block list updating device. This next memory block need not be the physically directly successive memory block (see FIG. 3 between the seventh and the eighth column). After the start block 380, it is tested in block 382 whether all memory locations of the memory block thus addressed have already been written once in the relevant cycle (tna=lmax?). If this is not so, at least one free memory location remains at the end of this memory block, and in block 384 the running write address maxa and the number of addresses processed in the relevant memory block "tna" are incremented by one unit. If the memory block is full, a new memory block is searched for in block 386. It has been found that this is always possible in the configuration described. First of all, the index cumax is updated in accordance with the procedure UNEXT which will be described with reference to FIG. 11. Subsequently, in the first block list updating device (containing the bookkeeping of the memory blocks) the address cumax is read and the procedure TAKEBLOCK is performed by way of the variables amax, maxa. The latter procedure will be described with reference to FIG. 12. Finally, the variable tna, being the address distance between the actual address and the beginning of the next memory block, is set to "1". Finally, in block 388 the list element XA just received from the serial memory is written at the memory address (maxa), and the procedure is abandoned again via the termination block 390.

Figure 11:
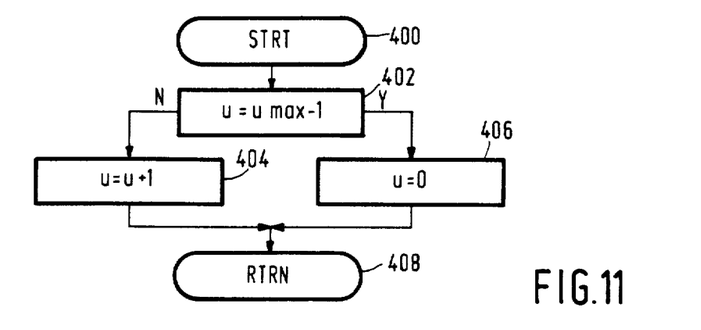
FIG. 11 is a flow chart for the operation of the first block list updating device.

FIG. 11 shows the procedure UNEXT which is used for the updating of the variable cumin in FIG. 9 and the variable cumax in FIG. 10. After the start block 400, in block 402 it is tested whether the memory index in the first block list updating device equals (umax−1), which means that the last memory element therein is addressed. If this condition is not satisfied, this index is incrmented in block 404. However, if it is satisfied, the index is set to zero in block 406. These indices are thus cycled (modulo umax). This procedure is terminated in block 408 (return). It is to be noted that umax must at least be equal to kmax (it may also be larger, but this requires additional storage capacity in the first block list updating device). Consequently, for each memory block containing at least one element of the list A the memory block boundary is stored in the first block list updating device. The memory block indices are updated during the procedures AFREE (cumin) and STOREX (cumax).

Figure 12:
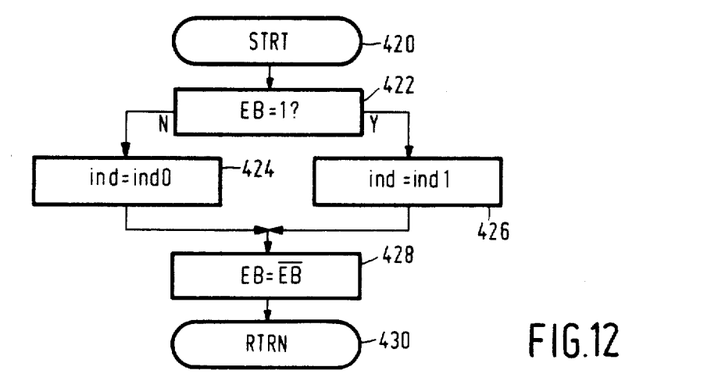
FIG. 12 is a flow chart for the operation of the second block list updating device upon deactivation of an indicated memory block.
Figure 13:
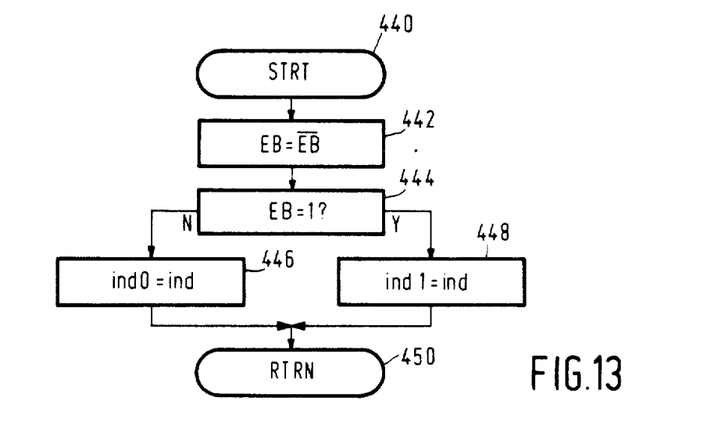
FIG. 13 is a flow chart for the second block list updating device upon activation of the indication of a new available memory block.

FIGS. 12, 13 show the procedures TAKEBLOCK and GIVEBLOCK which concern the actual taking into possession of a memory block which is initiated in FIG. 10, block 386, and the actual release of a memory block which is initiated at various locations in the FIGS. 6, 7a, 7b, 7c, 7d, 8, 9, respectively. The procedure is performed by way of the second block list updating device which comprises two memory locations which are addressed by "ind0" and "ind1" respectively. Each of the two memory locations can accommodate a memory index for the first block list updating device, so that a memory block start address for the read/write memory can be obtained by the addressing of the second block list updating device in the first block list updating device. Furthermore, a flag bit EB is declared. In FIG. 12 it is detected, after the start block 420, whether the bit EB has the value "1". If this is not so, in block 424 the variable "ind" (memory index for the first block list updating device) is made equal to the content of the address "ind0" in the second block list updating device. If EB=1, the same is applicable as regards ind1. Subsequently, the bit EB is inverted in block 428 and the system returns to the original flow chart in block 430. In FIG. 13, after the start block 440, the prevailing bit value EB is inverted in block 442. In block 444 it is detected whether EB is "1". If this is not the case, the variable at the address "ind0" is made equal to the actual memory index in the first block list updating device, so that the memory block thus assigned is indicated as being freely available. If EB=1, however, the address "ind1" becomes the actual memory index for the first block list updating device. After the completion of the flow chart of FIG. 13 by the second block list updating device, always the two most recently vacated memory blocks are present at the addresses ind0, ind1. At least one thereof remains available until after the flow chart of FIG. 12 has been completed. It may be that after the completion of the flow chart of FIG. 12 no further memory block is available for the storage of further elements of the list A. However, before this flow chart is reached again, the system will always have completed the flow chart of FIG. 13 at least once.

What is claimed is:

1. A device for the merging of a first list A(i) of first elements which is ordered according to a first linear ordering criterion with a second list B(f) of second elements which is ordered according to a second linear ordering criterion in order to form a result list Z(t) of third elements which is ordered according to a third linear ordering criterion, so that each first element and each second element is represented by a third element, characterized in that said device comprises:
   (a) a random access read/write memory M(j) (26) which contains a number (kmax)>2 of memory blocks (26a . . . 26f), the (kmax−2) non-largest blocks thereof having a capacity which is sufficient for the storage of the second list;
   (b) a serial memory input/output (22, 66) for receiving said first elements and outputting said third elements, said receiving and outputting having equal rates;
   (c) a control device (28) for the merging operation, comprising:
      (c1) a storage control device for successively storing said second elements in said (kmax−2) memory blocks;
      (c2) indicator means for updating, when said serial memory input/output is activated, a first running write address (48) for the writing of said first elements, for updating a first running read address (50) for the first elements stored in the read/write memory, and for updating a second running read address (52) for the second elements stored in the read/write memory;
      (c3) comparison means (36) for comparing, in a first state of said comparison means and according to the third linear ordering criterion, the first and second elements stored at said first and second running read addresses and indicated by the indicator means, and for making one element thereof available for supply to the serial memory input/output on the basis of the comparison;
      (c4) a first block list updating device (42) for the updating of a series of start addresses of memory blocks used for the storage of said first elements;
      (c5) a second block list updating device (72) for indicating the start addresses of at least two memory blocks and, under the control of the passing of a memory block end by the first or second running read address, for indicating the start address of the memory block thus vacated and, under the control of the passing of a memory block end by the first running write address, for making a start address of a memory block thus far indicated available to the indicator means as a new first write address for the storage of said first elements, and for deactivating the latter indication within the second block list updating device, at least two memory blocks outside said (kmax−2) memory blocks being indicated in an initial state;
      (c6) vacating means for presenting, after the reception of the last one of said first elements on the serial memory connection, further first and/or second elements stored in the read/write memory to the serial memory connection in cooperation with said comparison means.

2. A device as claimed in claim 1, characterized in that all (kmax) memory blocks have the same capacity for (lmax) of the first and second list elements.

3. A device as claimed in claim 2, characterized in that the second block list updating device indicates a first and a second memory block start address and comprises an indicator for indicating the most recently received one thereof in order to indicate that the least recently received one thereof may be replaced by a newly received start address and also that the most recently received one thereof is available for the indicator means.

4. A device as claimed in claim 1, characterized in that, when the ordering directions of said first and second linear ordering criteria are the same, the storage control device has the same address incrementation direction as the indicator means and, when the ordering directions are not the same, the storage control device has the opposite address incrmentation direction with respect to the indicator means.

5. A devicce as claimed in claims 1, 2, 3 or 4, characterized in that the storage control device is connected to the serially operating memory connection and to the indicator means in order to update, upon serial reception of said second elements on the memory connection, a second running write address within said (kmax−2) memory blocks, and also comprises detection means for activating, upon reception of the last one of said second elements or when the end of the last one of said (kmax−2) memory blocks is reached, the other elements of the control device and for activating, exclusively in the latter case, a repeat element for activating the storage control device again upon deactivation of the vacating means, the previously merged third elements then acting as first elements again.

6. A device as claimed in claims 1, 2, 3 or 4, characterized in that the comparsion means have a second state which arises upon activation and which serves for the direct comparsion of a second element indicated by the indicator means with a first element received on the serial memory connection so that said first state is activated only after the supply of a first element to the read/write memory.

* * * * *